(12) United States Patent
 Chang

(10) Patent No.: US 9,479,623 B2
(45) Date of Patent: Oct. 25, 2016

(54) MOBILE TERMINAL HOUSING

(71) Applicant: HON HAI PRECISION INDUSTRY CO., LTD., New Taipei (TW)

(72) Inventor: Shao-Han Chang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/509,508

(22) Filed: Oct. 8, 2014

(65) Prior Publication Data

US 2015/0163332 A1 Jun. 11, 2015

(30) Foreign Application Priority Data

Dec. 5, 2013 (CN) .......................... 2013 1 0645141

(51) Int. Cl.
 *G02B 6/00* (2006.01)
 *H04M 1/02* (2006.01)
 *H04M 1/22* (2006.01)
 *F21V 8/00* (2006.01)

(52) U.S. Cl.
 CPC .......... *H04M 1/0202* (2013.01); *G02B 6/0043* (2013.01); *H04M 1/22* (2013.01)

(58) Field of Classification Search
 USPC ................. 455/566, 575.8, 41.3, 415, 412.2, 455/575.1; 362/620, 23.15, 23.16, 245, 362/297, 259, 296.1, 88, 154
 See application file for complete search history.

(56) References Cited

U.S. PATENT DOCUMENTS

| 2002/0024808 A1* | 2/2002 | Suehiro | G09F 9/33 362/245 |
| 2008/0187716 A1* | 8/2008 | Yu | B29C 45/14811 428/138 |
| 2008/0205873 A1* | 8/2008 | Park | G03B 11/06 396/200 |
| 2009/0003002 A1* | 1/2009 | Sato | G02B 6/0043 362/341 |
| 2009/0196048 A1* | 8/2009 | Kataoka | G02B 6/0086 362/297 |
| 2011/0131849 A1* | 6/2011 | Sato | G02B 6/0061 40/564 |
| 2012/0229727 A1* | 9/2012 | Murata | F21V 13/04 349/61 |
| 2013/0045781 A1* | 2/2013 | Tho | H04M 1/22 455/575.1 |
| 2013/0182413 A1* | 7/2013 | Shin | G02F 1/133606 362/97.1 |
| 2015/0155903 A1* | 6/2015 | Jang | H04B 1/3888 455/575.8 |

FOREIGN PATENT DOCUMENTS

| CN | 101674342 A | 3/2010 |
| CN | 102866730 A | 1/2013 |
| TW | 200706088 A | 2/2007 |

\* cited by examiner

*Primary Examiner* — Ganiyu A Hanidu
(74) *Attorney, Agent, or Firm* — Zhigang Ma

(57) ABSTRACT

A mobile terminal housing includes a rear plate made of transparent material and a front plate coupled with the rear plate. The mobile terminal housing further includes a plastic member fitting closely to the rear plate and positioned between the rear plate and the front plate and a mirror coating. The rear plate includes an outer surface and an inner surface opposite to each other. The plastic member forms a light transmission hole. The mirror coating is positioned on the outer surface of the rear plate and overlaps the light transmission hole, and a size of the mirror coating is larger than that of the light transmission hole. The mobile terminal housing is able to give visual indications of activity even when resting on its face.

20 Claims, 6 Drawing Sheets

MOBILE TERMINAL HOUSING

FIELD

The subject matter herein generally relates to a mobile terminal housing.

BACKGROUND

When a conventional mobile terminal receives a new text message or a call, it may warn or remind the user of a particular state by emitting a light from a light emitting diode (LED). For example, a display screen can be lit up when a call is received. However, the user may not see the display screen when the display screen is flat against a desk. Therefore, it is necessary to provide a mobile terminal housing which can transmit more conspicuous light.

BRIEF DESCRIPTION OF THE DRAWINGS

Implementations of the present technology will now be described, by way of example only, with reference to the attached figures.

DETAILED DESCRIPTION

Figure 1:
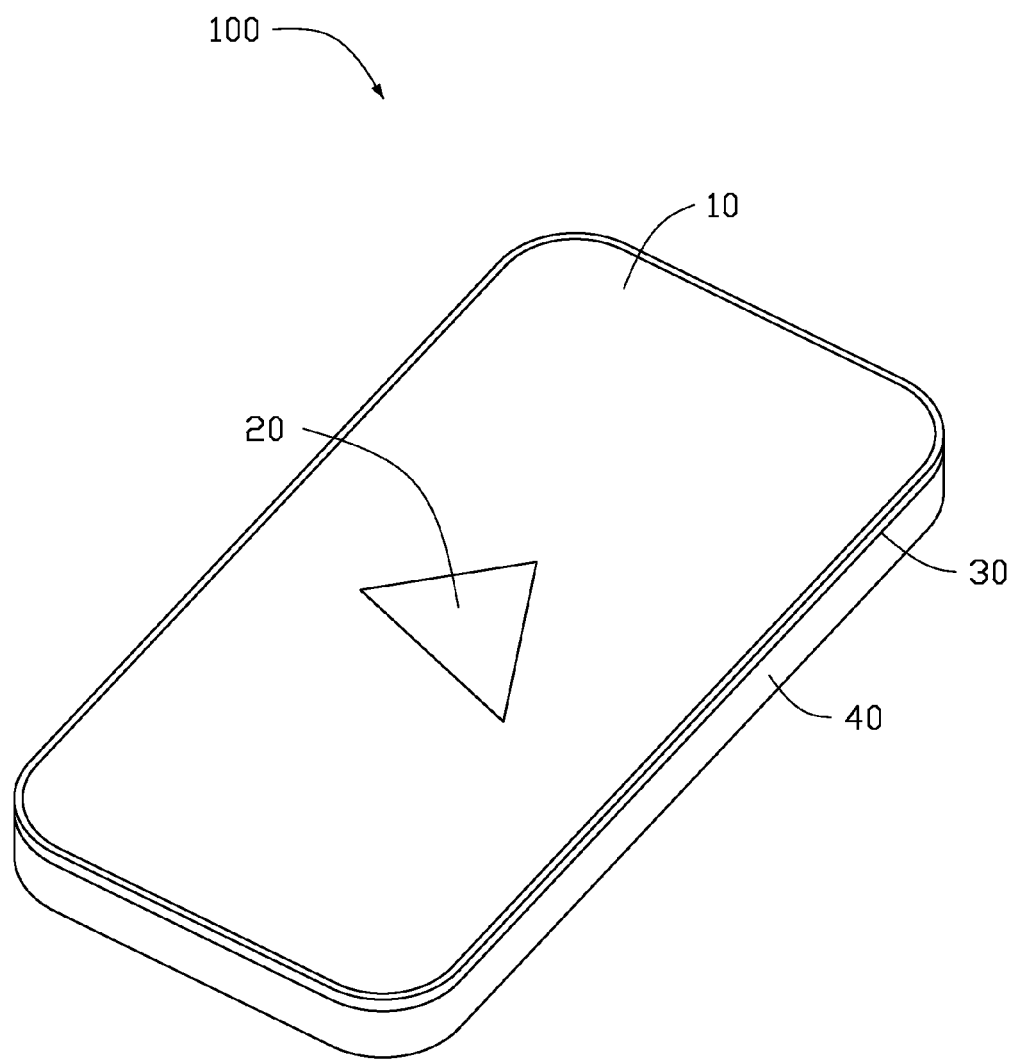
FIG. 1 is an isometric view of an embodiment of a mobile terminal housing.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that is modified by the word "substantially", such that the feature of the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure describes a mobile terminal housing which can emit light.

FIG. 1 illustrates a mobile terminal housing 100 including a rear plate 10, a mirror coating 20, a plastic member 30, and a front plate 40. The rear plate 10 can be coupled with the front plate 40 to form a receiving space 70 (see FIG. 3). The mirror coating 20 can be positioned on the rear plate 10, and the plastic member 30 can be interposed between the rear plate 10 and the front plate 40.

Figure 2:
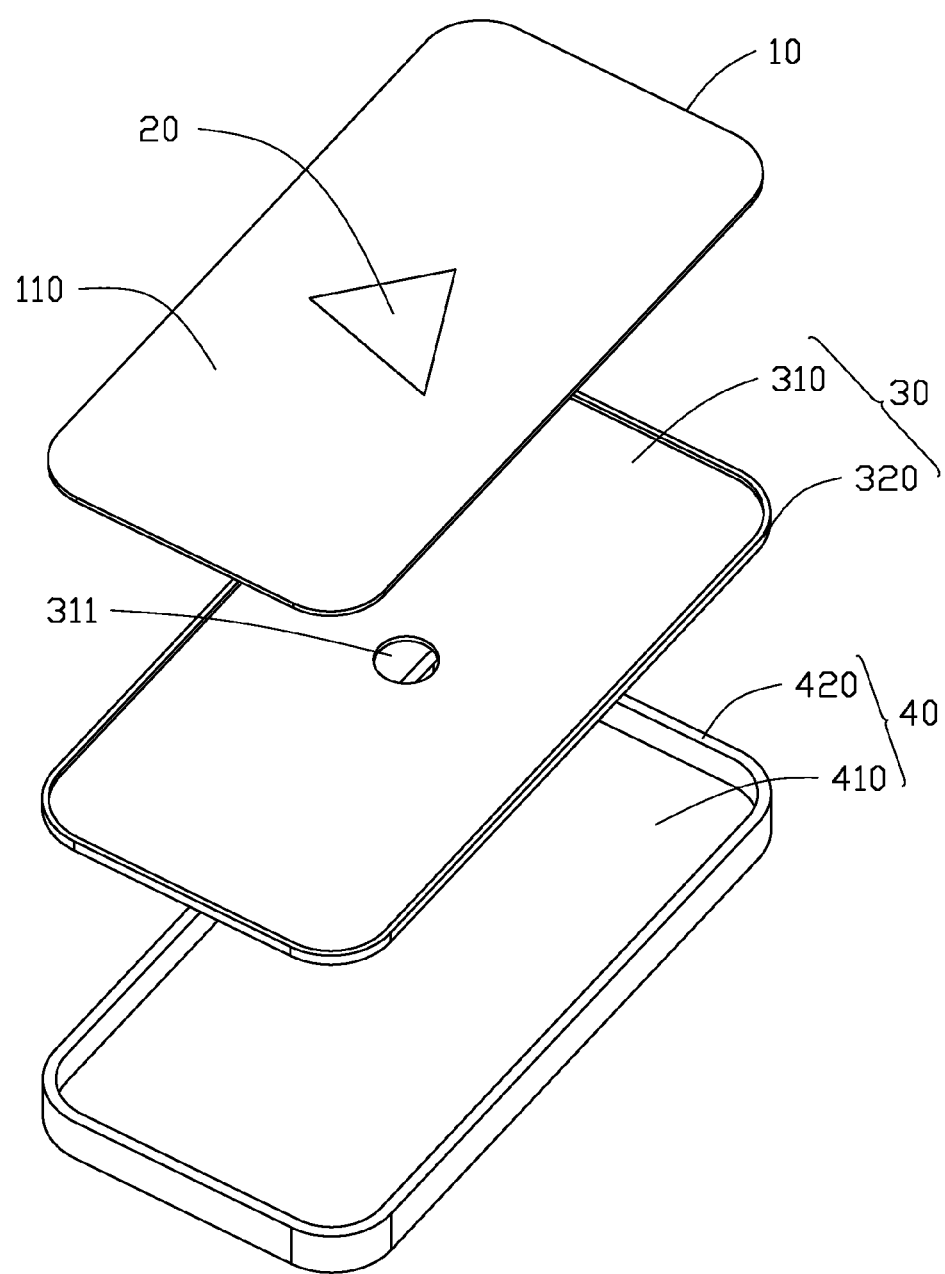
FIG. 2 is an exploded isometric view of the mobile terminal housing of FIG. 1.

FIG. 2 illustrates that the rear plate 10 can include an outer surface 110 away from the front plate 40. The rear plate 10 can be made of glass. In other embodiments, the rear plate 10 can be made of other transparent materials.

The mirror coating 20 can be positioned on the outer surface 110. In at least one embodiment, the mirror coating 20 can be positioned in a central portion of the outer surface 110. In other embodiments, the mirror coating 20 can be positioned at one side of the outer surface 110. The mirror coating 20 can have a high reflectivity, and can be positioned on the rear plate 10 by coating or screen printing. The reflectivity of the mirror coating 20 can be greater than 80% of total reflectivity. The mirror coating 20 can be shaped as a commercial trademark of the mobile terminal or other decorative pattern.

The plastic member 30 can be made of plastic, including a main body 310 and four sidewalls 320 substantially vertically connected to the main body 310. The main body 310 can be a substantially rectangular plate matching with the rear plate 10. The main body 310 can include a light transmission hole 311 configured to transmit light to the rear plate 10. The mirror coating 20 can overlap the light transmission hole 31, and a size of the mirror coating 20 can be larger than a size of the light transmission hole 31. The mirror coating 20 with high reflectance can prevent the interior of the mobile terminal from being exposed to the view of the user. In at least one embodiment, the light transmission hole 311 can be circular. In other embodiments, the light transmission hole 311 can be other shapes. A shape of the light transmission hole 311 can be the same as that of the mirror coating 20.

The front plate 40 can be substantially box-shaped and include a base plate 410 and a side frame 420 vertically connected to the base plate 410. The base plate 410 can include a display screen (not shown). The side frame 420 can be connected to the plastic member 30.

Figure 3:
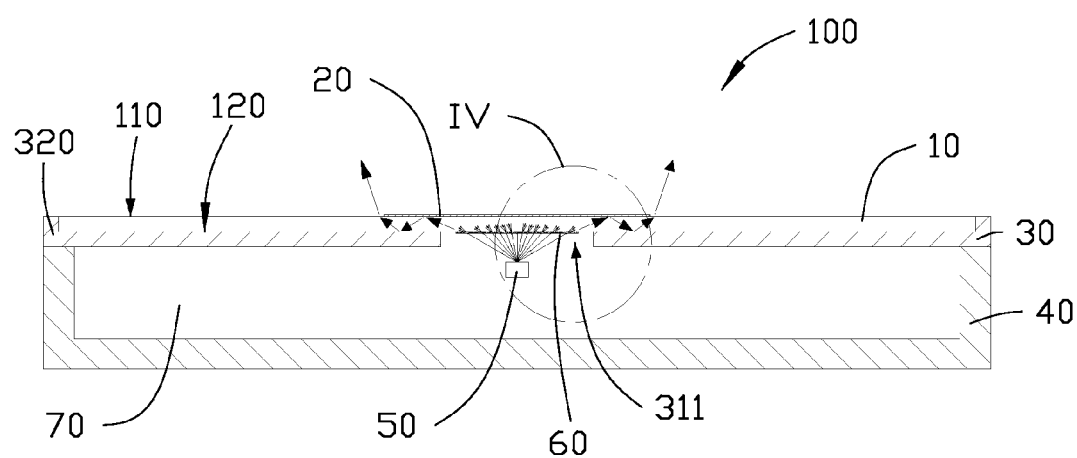
FIG. 3 is a cross-sectional view of the mobile terminal housing of FIG. 1.

FIG. 3 illustrates that the plastic member 30 can connect the rear plate 10 and the front plate 40. The plastic member 30 can be closely fit with the rear plate 10, and the edges of the rear plate 10 can be surrounded by the sidewalls 320 of the plastic member 30. As the plastic member 30 has a buffer function, the rear plate 10 can be protected. In at least one embodiment, the plastic member 30 can be integrated with the rear plate 10 by insert molding. The rear plate 10 can further include an inner surface 120 opposite to the outer surface 110, and the main body 310 of the plastic member 30 can fit against the inner surface 120. In at least one embodiment, the inner surface 120 can be coated by a decorative film 121 for aesthetic purposes.

The mobile terminal housing 100 can further include a light source 50 configured to supply light to the rear plate 10. The light source 50 can be a light emitting diode (LED) in the receiving space 70 of the mobile terminal. The light source 50 can be positioned below the light transmission hole 311. In at least one embodiment, the light source 50 can be positioned right below the central portion of the light transmission hole 311 and the mirror coating 20.

As most of the light emitted from the light source 50 can be reflected by the mirror coating 20, only a small portion of the light can be transmitted to the rear plate 10. In order to improve the light utilization rate, a light diffusion mechanism 60 can be positioned on the inner surface 120 of the rear plate 10 to correspond to the light transmission hole 311.

Figure 4:
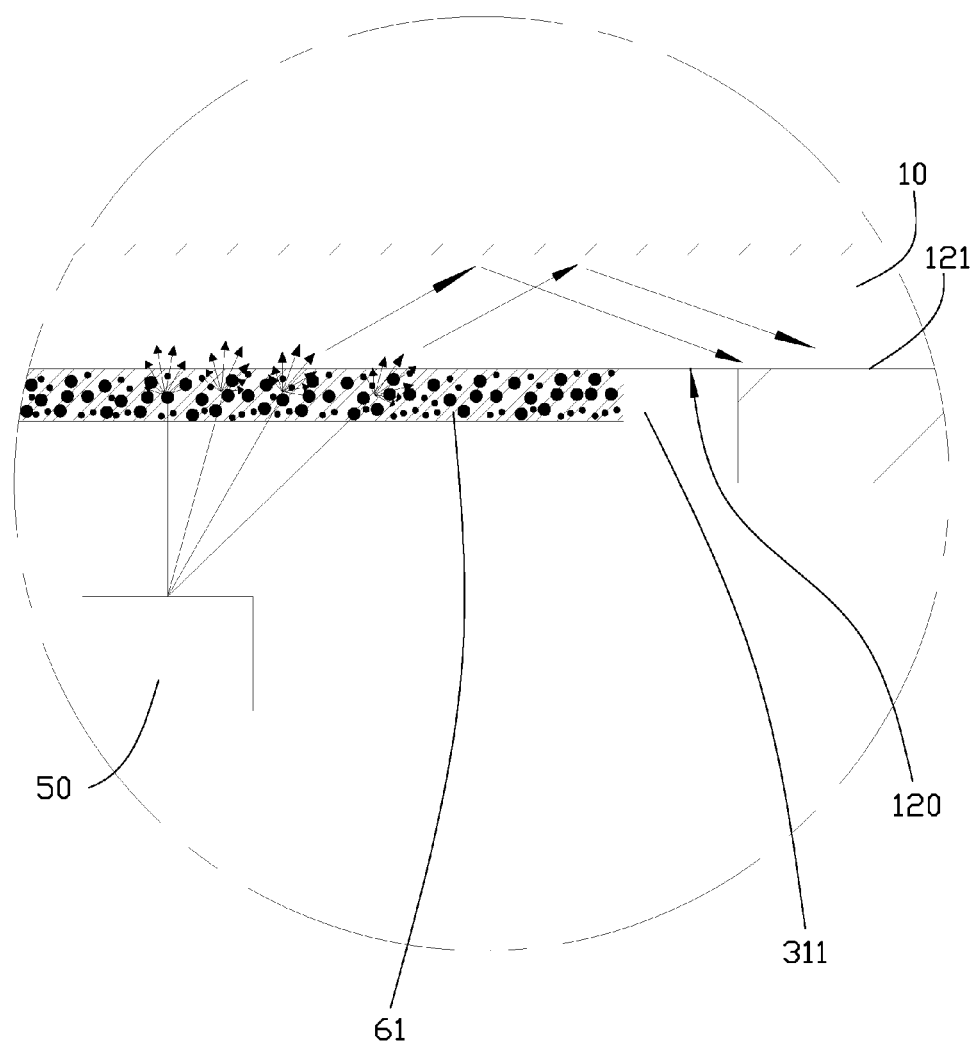
FIG. 4 is an enlarged view of a circled portion IV of FIG. 3 of a first embodiment.

FIG. 4 illustrates a light diffusion mechanism 61 according to a first embodiment. The light diffusion mechanism 61 can be positioned on the inner surface 120 corresponding to the light transmission hole 311. The light diffusion mechanism 61 can be a light diffusing ink layer coated on the inner surface 120 whereby the light transmitted to light diffusion mechanism 61 can be scattered.

Figure 5:
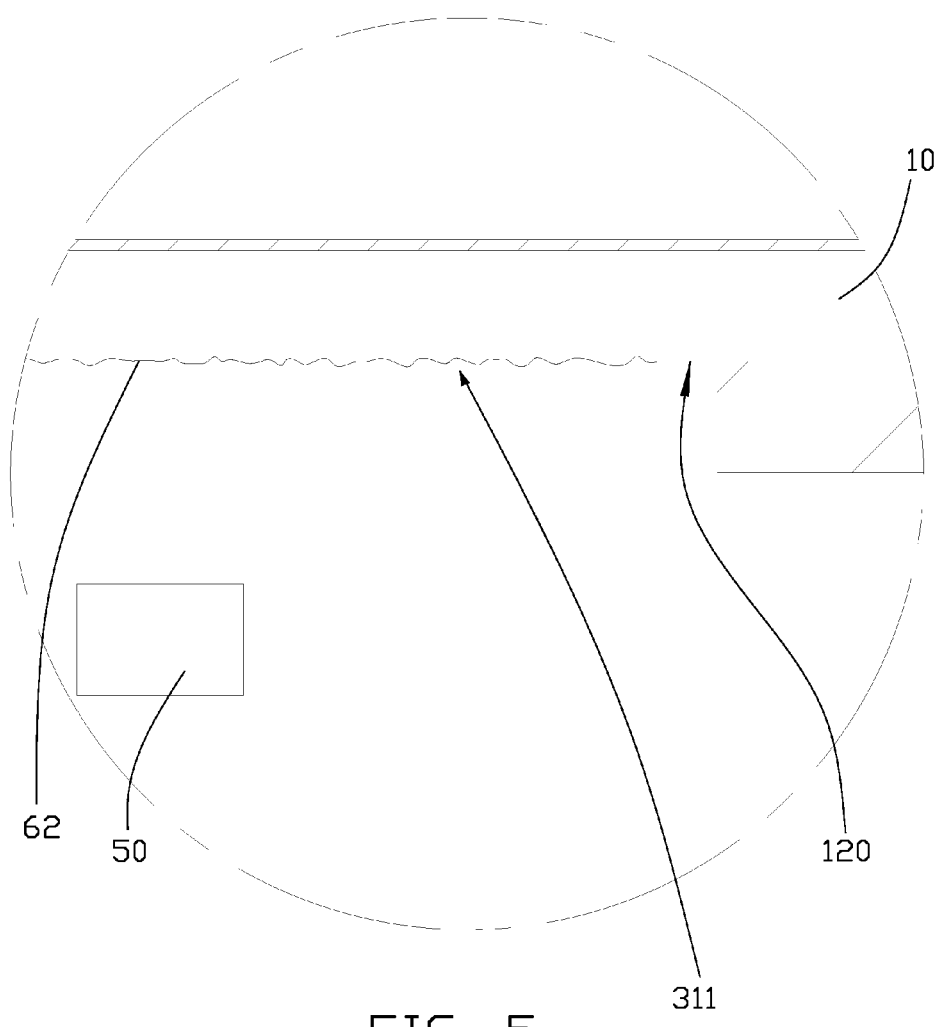
FIG. 5 is an enlarged view of the circled portion IV of FIG. 3 of a second embodiment.

FIG. 5 illustrates a light diffusion mechanism 62 according to a second embodiment. The light diffusion mechanism 62 can be a non-smooth surface and can correspond in shape to the light transmission hole 311. In at least one embodiment, the inner surface 120 of the rear plate 10 can be ground by a grinding tool to increase the surface roughness whereby the light transmitted to light diffusion mechanism 62 can be scattered.

Figure 6:
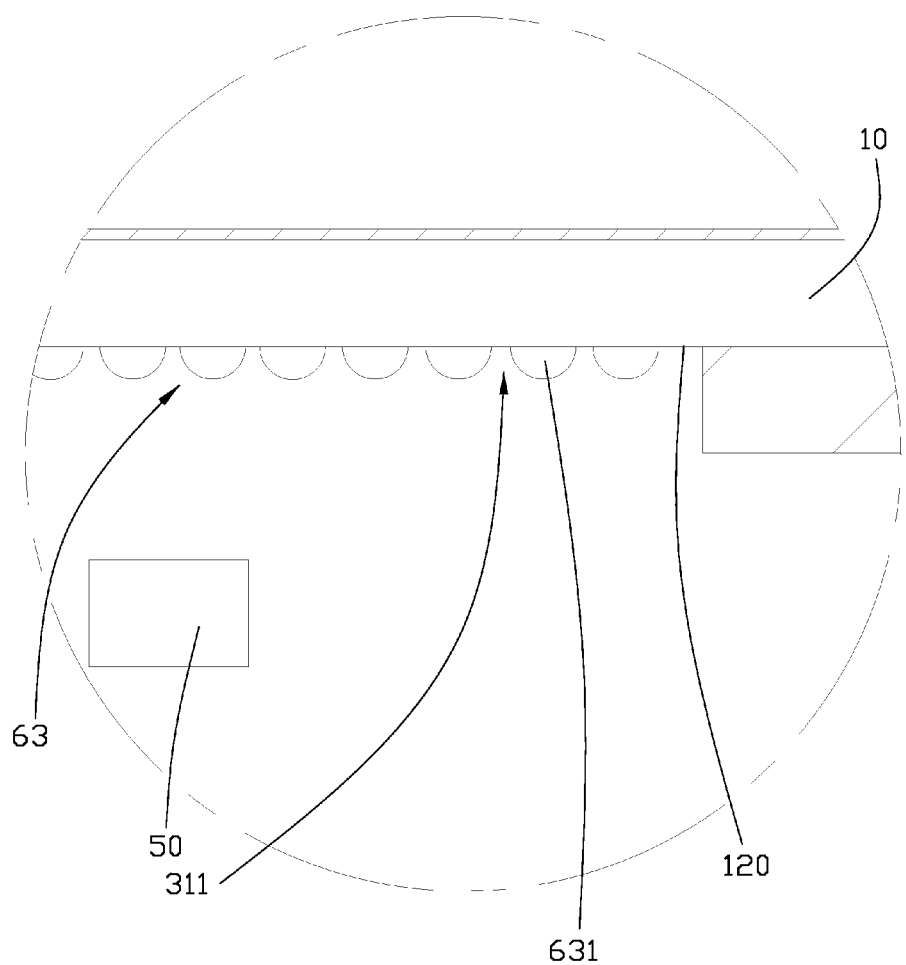
FIG. 6 is an enlarged view of the circled portion IV of FIG. 3 of a third embodiment.

FIG. 6 illustrates that a light diffusion mechanism 63 according to a third embodiment can include a plurality of micro prisms 631.

In other embodiments, the light diffusion mechanism 60 can be other structure, as long as the light transmitted to the inner surface 120 can be diffused by the light diffusion mechanism 60.

In use, the light source 50 can be illuminated when the mobile terminal receives a call, a new text message, or the mobile terminal needs to alert the user as to some other state. The light emitted from the light source 50 can be transmitted to the light diffusion mechanism 60 through the light transmission hole 311, and diffused by the light diffusion mechanism 60. The light then can be transmitted to the mirror coating 20. As the mirror coating 20 can have a high reflectivity, the light can undergo multiple reflections. Then the light can be transmitted to the periphery of the mirror coating 20 and the first surface 110, and be conspicuously visible to human eyes.

The mobile terminal housing can transmit light to warn users of a particular state without using a light guiding member, such as a light guide plate. The mobile terminal housing can be simple and the thickness and the weight of the mobile terminal are not increased.

The embodiments shown and described above are only examples. Many details are often found in the art such as the other features of a waterproof housing. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A mobile terminal housing comprising:
a rear plate made of transparent glass, wherein the rear plate comprises an outer surface and an inner surface opposite to the outer surface;
a front plate coupled with the rear plate to form an inner space of the mobile terminal;
a plastic member closely attached to the rear plate and positioned between the rear plate and the front plate, wherein the plastic member forms a light transmission hole;
a mirror coating positioned on the outer surface of the rear plate, wherein the mirror coating has a high reflectivity and is configured to reflect light, the reflectivity of the mirror coating is greater than 80% of total reflectivity, and the mirror coating overlaps the light transmission hole and a size of the mirror coating is larger than that of the light transmission hole; and
a light source positioned below a central portion of the light transmission hole and the mirror coating;
wherein the inner surface of the rear plate comprises a light diffusion mechanism corresponding to the light transmission hole, and the light diffusion mechanism is positioned in the light transmission hole; light emitted from the light source is configured to be diffused by the light diffusion mechanism and reflected between the mirror coating and the inner surface of the rear plate, and then transmitted to a periphery of the mirror coating.

2. The mobile terminal housing as claimed in claim 1, wherein the light diffusion mechanism is a light diffusing ink layer.

3. The mobile terminal housing as claimed in claim 1, wherein the light diffusion mechanism is a non-smooth surface.

4. The mobile terminal housing as claimed in claim 1, wherein the light diffusion mechanism comprises a plurality of micro prisms.

5. The mobile terminal housing as claimed in claim 1, wherein the mirror coating is positioned in the central portion of the rear plate.

6. The mobile terminal housing as claimed in claim 1, wherein the mirror coating is positioned on the rear plate by coating or screen printing.

7. The mobile terminal housing as claimed in claim 1, wherein the plastic member comprises a main body and a plurality of sidewalls vertically connected to the main body; the main body is closely attached to the inner surface of the rear plate, and the edges of the rear plate are surrounded by the sidewalls.

8. The mobile terminal housing as claimed in claim 7, wherein the rear plate and the main body are substantially rectangular plate shaped.

9. The mobile terminal housing as claimed in claim 1, wherein the plastic member is integrated with the rear plate.

10. The mobile terminal housing as claimed in claim 1, wherein the light source is a light emitting diode.

11. A mobile terminal housing comprising:
a rear plate made of transparent glass, wherein the rear plate comprises an outer surface and an inner surface opposite to the outer surface, and the inner surface is coated by a decorative film;
a front plate coupled with the rear plate to form an inner space of the mobile terminal;

a plastic member closely attached to the rear plate and positioned between the rear plate and the front plate, wherein the plastic member forms a light transmission hole;

a mirror coating positioned on the outer surface of the rear plate, wherein the mirror coating has a high reflectivity and is configured to reflect light, and the mirror coating overlaps the light transmission hole and a size of the mirror coating is larger than that of the light transmission hole; and a light source positioned below a central portion of the light transmission hole and the mirror coating;

wherein the inner surface of the rear plate comprises a light diffusion mechanism corresponding to the light transmission hole, light emitted from the light source is configured to be diffused by the light diffusion mechanism and reflected between the mirror coating and the decorative film, and then transmitted to a periphery of the mirror coating.

12. The mobile terminal housing as claimed in claim 11, wherein the light diffusion mechanism is a light diffusing ink layer.

13. The mobile terminal housing as claimed in claim 11, wherein the light diffusion mechanism is a non-smooth surface.

14. The mobile terminal housing as claimed in claim 11, wherein the light diffusion mechanism comprises a plurality of micro prisms.

15. The mobile terminal housing as claimed in claim 11, wherein the mirror coating is positioned in the central portion of the rear plate.

16. The mobile terminal housing as claimed in claim 11, wherein the mirror coating is positioned on the rear plate by coating or screen printing.

17. The mobile terminal housing as claimed in claim 11, wherein the plastic member comprises a main body and a plurality of sidewalls vertically connected to the main body; the main body is closely attached to the inner surface of the rear plate, and the edges of the rear plate are surrounded by the sidewalls.

18. The mobile terminal housing as claimed in claim 17, wherein the rear plate and the main body are substantially rectangular plate shaped.

19. The mobile terminal housing as claimed in claim 11, wherein the plastic member is integrated with the rear plate.

20. The mobile terminal housing as claimed in claim 11, wherein the light source is a light emitting diode.

* * * * *